United States Patent [19]

Anderson

[11] 4,391,236

[45] Jul. 5, 1983

[54] CD IGNITION WITH AUTOMATIC SPARK RETARD

[75] Inventor: Philip A. Anderson, Waukegan, Ill.

[73] Assignee: Outboard Marine Corporation, Waukegan, Ill.

[21] Appl. No.: 286,699

[22] Filed: Jul. 24, 1981

[51] Int. Cl.³ .......................... F02D 5/04; F02P 1/00; F02P 3/06; F02P 1/08

[52] U.S. Cl. ............................... 123/149 C; 123/596; 123/597; 123/605

[58] Field of Search ............... 123/596, 597, 605, 650, 123/651, 652, 655, 406, 415, 418, 149 C

[56] References Cited

U.S. PATENT DOCUMENTS

| | | | |
|---|---|---|---|
| 4,005,694 | 2/1977 | Noe | 123/596 |
| 4,132,208 | 1/1979 | Yukawa | 123/149 C |
| 4,176,643 | 12/1979 | Beeghly | 123/149 C |
| 4,200,078 | 4/1980 | Cavil et al. | 123/605 |
| 4,201,171 | 5/1980 | Nanso et al. | 123/149 C |
| 4,216,756 | 8/1980 | Mura | 123/597 |

FOREIGN PATENT DOCUMENTS 1402892 8/1975 United Kingdom ................ 123/597

Primary Examiner—Raymond A. Nelli

Attorney, Agent, or Firm—Michael, Best & Friedrich

[57] ABSTRACT

Disclosed herein is a capacitor discharge ignition system adapted for use with an internal combustion engine and comprising a charge capacitor, an ignition coil primary winding, an ignition SCR, and a spark retard circuit connected in series relationship with the charge capacitor, the primary winding, and the ignition SCR. The spark retard circuit comprises a thyristor having an anode-cathode path connected in series relationship with the charge capacitor, the primary winding, and the ignition SCR, an RC delay network including a capacitor and a resistor with a junction therebetween, the network having one end connected to the thyristor anode and having an opposite end connected to the thyristor gate, and a zener diode connected between the thyristor gate and the RC delay network junction for selectively preventing full discharge of the capacitor through the primary winding for a predetermined period of time after the ignition SCR is rendered conductive, thereby allowing for over advancing at mid rpm range and providing for automatic spark retard at higher engine rpm. In one embodiment of the invention a potentiometer replaces the resistor in the RC delay network to allow for further adjustment of ignition spark timing.

22 Claims, 3 Drawing Figures

CD IGNITION WITH AUTOMATIC SPARK RETARD

FIELD OF THE INVENTION

The invention relates generally to capacitor discharge ignition systems, and more particularly, to CD ignition systems with circuit arrangements to provide for automatic spark retard at higher engine rpm and also to provide faster recharging of the charge capacitor after an ignition spark.

DESCRIPTION OF THE PRIOR ART

Attention is directed to the following U.S. Pat. Nos. which disclose capacitor discharge ignition systems: Minks 3,750,637 issued Aug. 7, 1973; Mainprize 3,729,647 issued Apr. 24, 1973; Haubner 3,898,972 issued Aug. 12, 1975; Beuk 3,669,086 issued June 13, 1972; Draxler 3,715,650 issued Feb. 6, 1973; Skibukawa et al 3,861,372 issued Jan. 21, 1975; and Yukawa 4,132,208 issued Jan. 2, 1979.

SUMMARY OF THE INVENTION

The invention provides a capacitor discharge ignition circuit adapted for use with an internal combustion engine and for connection to an ignition coil primary winding, the circuit comprising a charge capacitor, an ignition SCR, and spark retard circuit means connecting the charge capacitor and the ignition SCR in series relationship with the primary winding and operative for selectively preventing full discharge of the capacitor through the primary winding for a predetermined period of time after the ignition SCR is rendered conductive, thereby providing for automatic spark retard at higher engine rpm. The spark retard circuit means is also operative for selectively isolating the primary winding and the ignition SCR from the charge capacitor to provide for immediate recharging of the charge capacitor after the charge capacitor has discharged through the primary winding to effect an ignition spark.

In accordance with an embodiment of the invention, the spark retard circuit means comprises a thyristor having a gate, an anode and a cathode, and an anode-cathode path connected in series relationship with the charge capacitor, the primary winding and the ignition SCR, and further comprises delay means for preventing the thyristor from being rendered conductive for the predetermined period of time after the ignition SCR is rendered conductive. The delay means preferably comprises an RC delay network including a capacitor and a resistor with a junction therebetween, the network having one end connected to the thyristor anode and having an opposite end connected to the thyristor cathode, the delay means also comprising voltage threshold means, preferably in the form of a zener diode, connected between the thyristor gate and the RC delay network junction for preventing the thyristor from being rendered conductive for the predetermined period of time after the ignition SCR is rendered conductive. The delay means also further comprises unilateral current flow means, preferably in the form of a diode, connected between the thyristor anode and the RC delay network junction to allow for discharge of the delay network capacitor through the diode when the thyristor is rendered conductive.

The invention also provides a capacitor discharge ignition circuit wherein the delay means comprises adjustment means for varying the predetermined period of time, thereby allowing for adjustment of ignition spark timing. More particularly, the delay means preferably comprises an RC delay network, including a capacitor and a potentiometer with a junction therebetween, the network having one end connected to the thyristor and having an opposite end connected to the thyristor cathode, adjustment of the potentiometer resulting in adjustment of the ignition spark timing. In accordance with an embodiment of the invention, the ignition circuit is operative in connection with an engine throttle, and further comprises linkage means for connecting the potentiometer to the throttle so that ignition spark timing is adjustable in response to movement of the throttle.

The invention also provides a capacitor discharge ignition system adapted for use with an internal combustion engine and comprising a charge capacitor, an ignition coil primary winding, an ignition SCR, and spark retard circuit means as described above, connected in series relationship with the charge capacitor, the primary winding, and the ignition SCR.

One of the principal features of the invention is the provision of a capacitor discharge ignition circuit including a spark retard circuit operative in connection with an internal combustion engine to provide for automatic spark retard at higher engine rpm, thereby allowing for over advancing at mid rpm range.

Another of the principal features of the invention is the provision of such a capacitor discharge ignition circuit wherein the spark retard circuit includes an RC delay network having a potentiometer operative to allow for manual or automatic adjustment of the spark retard.

Another of the principal features of the invention is the provision of a capacitor discharge ignition system including such a spark retard circuit.

Another of the principal features of the invention is the provision of such a capacitor discharge ignition circuit wherein the spark retard circuit is operative so that the charge capacitor begins to immediately recharge after it discharges to effect an ignition spark.

Another of the principal features of the invention is to provide a capacitor discharge ignition system including such a spark retard circuit and which allows a single power supply to more effectively maintain suitable ignition voltage at high engine rpm when used with a multicylinder engine.

Other features and advantages of the embodiments of the invention will become known by reference to the following general description, claims, and drawings.

Figure 1:
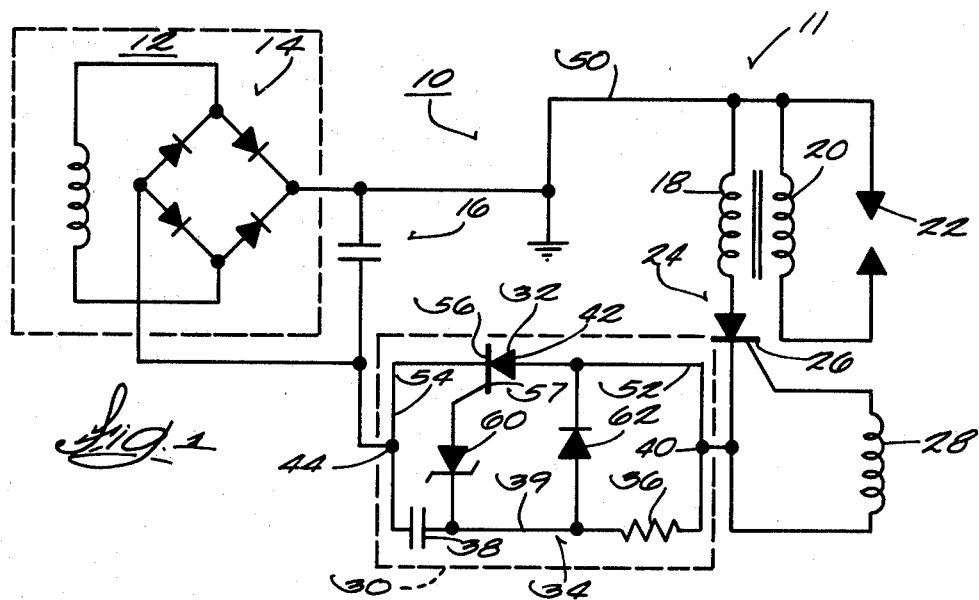
FIG. 1 is a schematic circuit of capacitor discharge ignition system which embodies various of the features of the invention.

Before explaining the embodiments of the invention in detail, it is to be understood that the invention is not limited in its application to the details of construction and the arrangement of components set forth in the following description or illustrated in the drawings. The invention is capable of other embodiments and of being practiced or carried out in various ways. Alos, it is to be understood that the phraseology and terminology employed herein is for the purpose of description and should not be regarded as limiting.

GENERAL DESCRIPTION

Shown in FIG. 1 is a capacitor discharge ignition system 10 which embodies various features of the invention. Generally, the system 10 includes a power supply 12 having a full wave rectifying diode bridge 14 which is connected to allow charging of the charge capacitor 16. The system 10 also includes an ignition coil 11 including a primary winding 18 and a secondary winding 20 which causes an ignition spark across the contacts of the spark plug 22 when the charge capacitor 16 discharges through the primary winding 18. The discharge of the charge capacitor 16 is controlled by a suitable switch such as an ignition SCR 24 which is rendered conductive upon application a trigger pulse applied to the gate 26 of the SCR 24 by a trigger coil, designated 28, which may be mounted on a trigger plate (not shown) which is movable by a conventional throttle linkage (not shown) to allow for adjustment of the ignition timing. The preceeding components of the CD ignition system 10 are generally conventional in nature, so that greater detail of description is not necessary for one skilled in the art.

The CD ignition system 10 also includes a spark retard circuit means or circuit, shown in a dashed line box, generally designated 30, which is connected in series relationship with charge capacitor 16, the primary winding 18, and the ignition SCR 24. As will be discussed further below, the spark retard circuit means or circuit 30 is operable for preventing full discharge of the charge capacitor 16 through the primary winding 18 for a predetermined period of time after the ignition SCR 24 is rendered conductive, thus providing an automatic spark retard at higher engine rpm and thereby allowing over advancing at mid rpm range. The spark retard circuit is also preferably operable for selectively isolating the primary winding 18 and ignition SCR 24 from the charge capacitor 16 to provide for immediate recharging of the charge capacitor after the charge capacitor has discharged through primary winding 18 to effect an ignition spark.

While various spark retard circuit means or circuit arrangements are possible, in the illustrated preferred embodiment, such means comprises the spark retard circuit 30, including a thyristor, preferably in the form of an "isolation" SCR 32, having an anode-cathode path connected in series relationship with the anode-cathode path of the ignition SCR 24. As shown in the preferred embodiment, the spark retard circuit 30 also includes an RC delay network, generally designated 34, including a resistor 36 and a capacitor 38, with a junction or line, designated 39, connected therebetween. The RC delay network 34 includes one end 40 connected by lead 52 to the isolation SCR anode, designated 42, and includes an opposite end 44 connected by lead 54 to the cathode 56 of isolation SCR 32. The spark retard circuit 30 also includes a voltage threshold means, preferably in the form of a zener diode 60, which is connected between the gate 57 of isolation SCR 32 and the RC delay network junction 39 as illustrated. Also, as shown in FIG. 1, unilateral current flow means, preferably in the form of a diode 62, is connected between annode 42 of SCR 32 and line or junction 39, to allow for immediate discharge of capacitor 38 after SCR 32 is rendered conductive, as will be described further below.

To describe the operation of the CD ignition system 10, it will be assumed that charge capacitor 16 is fully charged and a trigger signal produced by the trigger coil 28 is applied to the gate 26 of the ignition SCR 24. When SCR 24 is rendered conductive, current begins to flow from capacitor 16 through the ignition coil 18 through SCR 24 and through resistor 36 and capacitor 38 of the RC delay network 34. A predetermined period of time later, when the voltage on capacitor 38 reaches the breakover potential of the voltage threshold means or the zener diode 60, the voltage is applied to the gate 57 and isolation SCR 32 is switched on so that the charge voltage on charge capacitor 16 is fully impressed across the ignition coil primary 18 and the spark plug fires. The predetermined delay of the RC delay network 34, i.e., the predetermined time it takes for a voltage to build up on capacitor 38 sufficient to breakdown zener diode 60 and trigger SCR 32, allows for over-advancing at the mid rpm range.

More particularly, for some types of internal combustion engines, for example a 4-cylinder marine engine, it is desirable to advance the spark at the mid-rpm range to a greater degree than can be tolerated at the higher engine rpm range. The present invention provides such an arrangement allowing an "over-advance" of 35° before top dead center at 3,000 rpm, and a "retarded" advance of 29° at 6,000 rpm. For purposes of example only, assume that a conventional trigger plate linkage and stop arrangement (not shown) is utilized so that at 3,000 rpm, the ignition timing is 35° before top dead center. Again for purposes of example only, assume resister 36 is 10 Kohms and capacitor 38 is 0.33 microfarads. At these values, there is a fixed or predetermined time delay of 0.33 milliseconds between the time the ignition SCR 24 is triggered and the time the voltage on capacitor 38 exceeds the breakover potential of zener diode 60 so that isolation SCR 32 is turned on and the spark plug fires. The time delay of the RC network at 3,000 rpm corresponds to a spark retard of 6°, which is compensated for by the timing plate linkage and stop so that the timing is 35° BTDC. It should be appreciated that at higher engine rpm, the fixed RC delay automatically further retards the spark. For example, at 6,000 rpm, the fixed RC time delay results in a 12° spark retard so that ignition timing is retarded to 29° BTDC, which can be tolerated by the engine. Accordingly, the spark retard circuit 30 provides for automatic spark retard at higher engine rpm and allows for over-advancing the engine at mid-rpm range, as described above.

In addition, the spark retard circuit 30 provides for immediate recharging of the charge capacitor after the charge capacitor discharges to effect the ignition spark. Such immediate recharging results in the capacitor discharge ignition system maintaining a suitable magnitude voltage at relatively higher engine rpm.

More particularly, when the charge capacitor 16 discharges to near zero voltage (e.g. to 3 or 4 volts) and the current flow through the ignition SCR 24 and the isolation SCR 32 drops to below the holding current value of one of the SCRs (e.g. 20 milliamps) the current flow is cutoff and both SCRs turn off. Due to transient current flow the charge capacitor 16 will continue to discharge going through zero so that a back emf voltage (e.g., 3 volts) appears across capacitor 16. This back emf is limited by the voltage drop of the diodes of the diode bridge 14 of the power supply 12, and helps clamp the isolation SCR 32 off.

Ordinarily, without the provision of the spark retard circuit 30, at higher engine rpm, the trigger coil signal produced by the trigger coil 28 might cause the ignition SCR 24 to prematurely turn on again, and leakage voltage from the power supply 12 would flow through the primary winding and ignition SCR, thus preventing the charge capacitor 16 from beginning to recharge immediately after discharge.

With the provision of the spark retard circuit 30, however, leakage voltage is prevented, and the charge capacitor 16 begins immediate recharging after discharge. This is because when the isolation SCR 32 turns off it can not be prematurely turned back on, since the gate of the isolation SCR is isolated by the zener diode 60. Diode 62 allows for immediate discharge of the voltage of capacitor 38 through SCR 32 after SCR 32 is rendered conductive, so zener diode 60 will not break down. The immediate discharge of capacitor 38 allowed by diode 62 also insures that the fixed time delay of the RC delay network 34 remains the same, with the capacitor 38 charging up from zero volts each time after the triggering of the ignition SCR 24. Thus, when the isolation SCR 32 turns off, the charge capacitor 16 is isolated from the primary winding and ignition SCR, even though the ignition SCR 24 may be turned back on prematurely. Thus, the charge capacitor 16 immediately begins to recharge after its discharges to effect an ignition spark. As noted, the turn off of the isolation SCR 32 is assisted by the back emf of the charge capacitor 16 which reverse biases or clamps the isolation SCR 32 off. For purposes of example only, the isolation SCR 32 and ignition SCR 24 can be identical and 600 volt rated, and the charge capacitor 16 can have a value of one microfarad.

Generally, the spark retard circuit means 30 allows for immediate recharging of the charge capacitor so that a shorter time period between ignition sparks is required for the capacitor to become fully charged. This feature can be utilized with a single cylinder engine, for example, to extend the high engine rpm at which suitable ignition voltage is produced by at least several hundred rpm.

Figure 2:
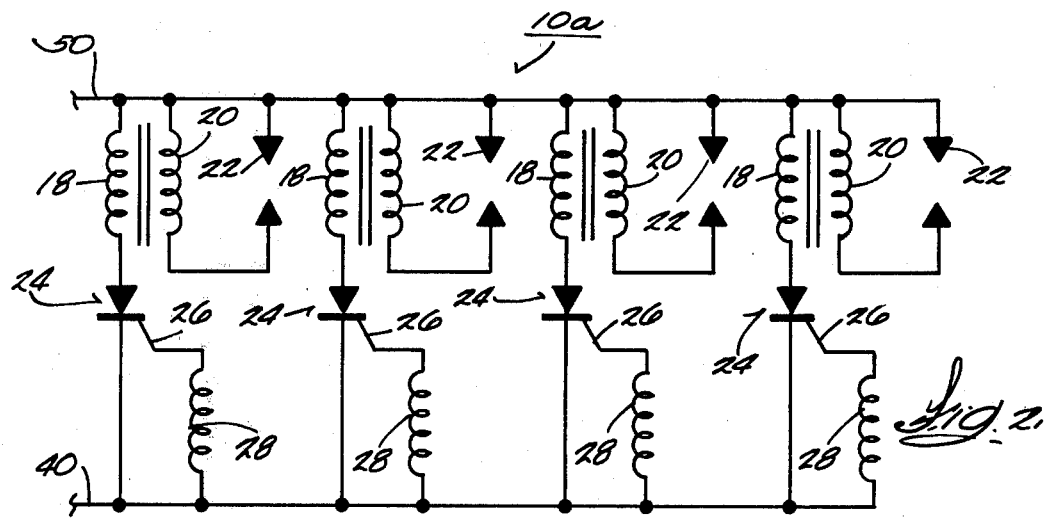
FIG. 2 is a schematic circuit of a portion of the capacitor discharge ignition system shown in FIG. 1, modified for use with a four cylinder engine.

The invention is also useful to maintain suitable ignition voltage for multiple cylinder engines having a CD ignition system powered, for example, by a single power supply. FIG. 2 shows a portion of a CD ignition system 10a, modified from that shown in FIG. 1 to include four sets of ignition coils, spark plugs, trigger coils, and ignition SCRs, for operation with a four cylinder engine. The remainder of the ignition system 10a is not shown, but it is to be understood that it is the same as the CD ignition system 10, except that four sets of ignition coils, spark pulgs, trigger coils, and ignition SCRs are connected to leads labelled 50 and 52, instead of the one set shown in FIG. 1. Components in FIG. 2 are labelled with the same numerals as corresponding components in FIG. 1.

Without the spark retard circuit means 30, a four cylinder CD ignition system with a single power supply might begin to become speed limited at, for example, 4,000 rpm, at which point the periods between ignition sparks would be too short to allow full charging of the capacitor and the ignition voltage would start to go down. At an engine speed of for example, 5,500 rpm, there might be insufficient voltage to effect ignition.

With the spark retard circuit 30, the four cylinder CD ignition system with a single power supply can remain operative at a relatively higher rpm, for example, 6,500 rpm, and still have suitable voltage to effect ignition. As noted, the spark retard circuit 30 allows immediate recharging of the charge capacitor so that a short time period between ignition sparks is sufficient to fully charge the charge capacitor. Thus, by utilizing the spark retard circuit 30 of the present invention, useable engine rpm can be increased before engine operation becomes speed limited, due to insufficient ignition voltage.

Figure 3:
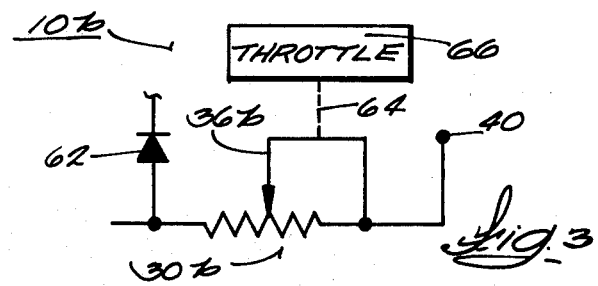
FIG. 3 is a schematic circuit of a modified portion of the capacitor discharge ignition system shown in FIG. 1, and embodies various of the features of the invention.

Shown in FIG. 3 is a portion of a capacitor discharge ignition system 10b which is modified from the previously described ignition system 10 by replacing resistor 36 with potentiometer 36b so that the spark retard circuit 30b provides for the adjustment of the spark timing of the engine. In particular, the resistance of the potentiometer 36b can be changed to change the length of the RC time delay, thereby changing the spark retard. Also, if desired, the potentiometer 36b could be connected by a linkage 64 or directly coupled to a throttle 66 (shown diagramatically) to thereby eliminate the need for a throttle linkage and stop connected to the trigger plate as used in a conventional ignition timing arrangement. Thus, the RC delay network with a potentiometer 36b could be utilized with manual adjustment to change the spark retard of the engine, or with a throttle linkage and automatic adjustment in response to the throttle to change the spark retard, eliminating the conventional throttle linkage to trigger plate arrangement if desired.

It is to be understood the invention is not confined to the particular construction and arrangement of components as herein illustrated and described, but embraces all such modified forms thereof as come within the scope of the following claims.

I claim:

1. A capacitor discharge ignition circuit adapted for use with an internal combustion engine and for connection to an ignition coil primary winding, said circuit comprising a charge capacitor, an ignition SCR, and spark retard circuit means connecting said charge capacitor and said ignition SCR in series relationship with said primary winding and operative for selectively preventing full discharge of said capacitor through said primary winding for a predetermined period of time after said ignition SCR is rendered conductive, thereby providing for automatic spark retard at higher engine rpm.

2. A capacitor discharge ignition circuit in accordance with claim 1 wherein said spark retard circuit means comprises a thyristor having a gate, an anode and a cathode, and an anode-cathode path connected in series relationship with said charge capacitor, said primary winding and said ignition SCR, and further comprises delay means for preventing said thyristor from being rendered conductive for said predetermined period of time after said ignition SCR is rendered conductive.

3. A capacitor discharge ignition circuit in accordance with claim 2 wherein said delay means comprises an RC delay network including a capacitor and a resistor with a junction therebetween, said network having one end connected to said thyristor anode and having an opposite end connected to said thyristor cathode, said delay means also comprising voltage threshold means connected between said thyristor gate and said RC delay network junction for preventing said thyristor from being rendered conductive for said predetermined period of time after said ignition SCR is rendered conductive.

4. A capacitor discharge ignition circuit in accordance with claim 3 wherein said voltage threshold means comprises a zener diode having an anode connected to said thyristor gate, and having a cathode connected to said RC delay network junction.

5. A capacitor discharge ignition circuit in accordance with claim 3 wherein said delay means further comprises unilateral current flow means connected between said thyristor anode and said RC delay network junction to allow for discharge of said delay network capacitor through said unilateral current flow means when said thyristor is rendered conductive.

6. A capacitor discharge ignition circuit in accordance with claim 5 wherein said unilateral current flow means comprises a diode having an anode connected to said RC delay network junction, and having a cathode connected to said thyristor anode.

7. A capacitor discharge ignition circuit in accordance with claim 2 wherein said delay means comprises adjustment means for varying said predetermined period of time, thereby allowing for adjustment of ignition spark timing.

8. A capacitor discharge ignition circuit in accordance with claim 7 wherein said delay means comprises an RC delay network, including a capacitor and a potentiometer with a junction therebetween, said network having one end connected to said thyristor and having an opposite end connected to said thyristor cathode, adjustment of said potentiometer resulting in adjustment of said ignition spark timing.

9. A capacitor discharge ignition circuit adapted for use with an internal combustion engine and for connection to an ignition coil primary winding, said circuit comprising a charge capacitor, an ignition SCR, and spark retard circuit means connecting said charge capacitor and said ignition SCR in series relationship with said primary winding and operative for selectively preventing full discharge of said capacitor through said primary winding for a predetermined period of time after said ignition SCR is rendered conductive, thereby providing for automatic spark retard at higher engine rpm, and also operative for selectively isolating the primary winding and said ignition SCR from said charge capacitor to provide for immediate recharging of said charge capacitor after said charge capacitor has discharged through said primary winding to effect an ignition spark.

10. A capacitor discharge ignition system adapted for use with an internal combustion engine and comprising a charge capacitor, an ignition coil primary winding, an ignition SCR, and spark retard circuit means connected in series relationship with said charge capacitor, said primary winding, and said ignition SCR, said spark retard circuit means operative for selectively preventing full discharge of said capacitor through said primary winding for a predetermined period of time after said ignition SCR is rendered conductive, thereby providing for automatic spark retard at higher engine rpm.

11. A capacitor discharge ignition system in accordance with claim 10 wherein said spark retard circuit means comprises a thyristor having a gate, an anode and a cathode, and an anode-cathode path connected in series relationship with said charge capacitor, said primary winding and said ignition SCR, and further comprises delay means for preventing said thyristor from being rendered conductive for said predetermined period of time after said ignition SCR is rendered conductive.

12. A capacitor discharge ignition system in accordance with claim 11 wherein said delay means comprises an RC delay network including a capacitor and a resistor with a junction therebetween, said network having one end connected to said thyristor anode and having an opposite end connected to said thyristor cathode, said delay means also comprising voltage threshold means connected between said thyristor gate and said RC delay network junction for preventing said thyristor from being rendered conductive for said predetermined period if time after said ignition SCR is rendered conductive.

13. A capacitor discharge ignition system in accordance with claim 12 wherein said voltage threshold means comprises a zener diode having an anode connected to said thyristor gate, and having a cathode connected to said RC delay network junction.

14. A capacitor discharge ignition system in accordance with claim 12 wherein said delay means further comprises unilateral current flow means connected between said thyristor anode and said RC delay network junction to allow for discharge of said delay network capacitor through said unilateral current flow means when said thyristor is rendered conductive.

15. A capacitor discharge system in accordance with claim 14 wherein said unilateral current flow means comprises a diode having an anode connected to said RC delay network junction, and having a cathode connected to said thyristor anode.

16. A capacitor discharge ignition system in accordance with claim 11 wherein said delay means comprises adjustment means for varying said predetermined period if time, thereby allowing for adjustment of ignition spark timing.

17. A capacitor discharge ignition system in accordance with claim 16 wherein said delay means comprises an RC delay network, including a capacitor and a potentiometer with a junction therebetween, said network having one end connected to said thyristor and having an opposite end connected to said thyristor cathode, adjustment of said potentiometer resulting in adjustment of said ignition spark timing.

18. A capacitor discharge ignition system in accordance with claim 17 adapted to be operative in connection with an engine throttle, further comprising linkage means for connecting said potentiometer to said throttle so that ignition spark timing is adjustable in response to movement of said throttle.

19. A capacitor discharge ignition system for a four cylinder engine comprising a charge capacitor, a power supply including a full-wave diode rectifying bridge having its output terminals connected across said charge capacitor, four sets of ignition components, each set including an ignition coil primary winding, and an ignition SCR, said system further comprising spark retard circuit means connected in series relationship with said charge capacitor, and operative for selectively preventing full discharge of said capacitor through said primary winding for a predetermined period of time after each of said ignition SCR's is rendered conductive, thereby providing for automatic spark retard at higher engine rpm, and also operative for selectively isolating the primary winding and said ignition SCRs from said charge capacitor to provide for immediate recharging of said charge capacitor after said charge capacitor has discharged through said primary winding to effect an ignition spark.

20. An automatic spark retard circuit adapted for use with a capacitor discharge ignition system for an engine, said system including a charge capacitor, an ignition coil primary winding, and an ignition SCR, said spark retard circuit comprising a thyristor having a gate, an anode and a cathode, said thyristor having an anode-cathode path adapted for connection in series relationship with the charge capacitor, the primary winding and the ignition SCR, said spark retard circuit further comprising an RC delay network including a capacitor and a resistor with a junction therebetween, said network having one end connected to said thyristor anode and having an opposite end connected to said thyristor gate, said spark retard circuit further comprising voltage threshold means connected between said thyristor gate and said RC delay network junction for selectively preventing full discharge of said capacitor through said primary winding for a predetermined period of time after said ignition SCR is rendered conductive, thereby providing for automatic spark retard at higher engine rpm.

21. An automatic spark retard circuit in accordance with claim 20, wherein said voltage threshold means comprises a zener diode having an anode connected to said thyristor gate and having a cathode connected to said RC delay network junction.

22. An automatic spark retard circuit in accordance with claim 21, further comprising a diode having an anode connected to said RC network junction and having a cathode connected to said thyristor anode.

* * * * *